(No Model.) 2 Sheets—Sheet 1.
W. YOUNG.
IMPLEMENT FOR PLANTING HEDGES.

No. 425,531. Patented Apr. 15, 1890.

Witnesses
E. D. Smith
Thomas Durant

Inventor
Wesley Young,
By his Attorneys
Church & Church (No Model.) 2 Sheets—Sheet 2.
W. YOUNG.
IMPLEMENT FOR PLANTING HEDGES.
No. 425,531. Patented Apr. 15, 1890.
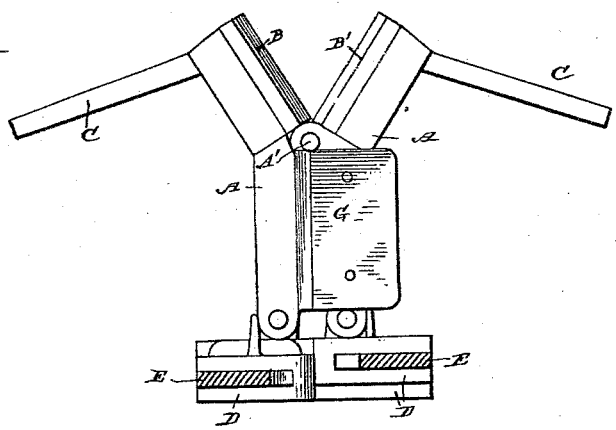
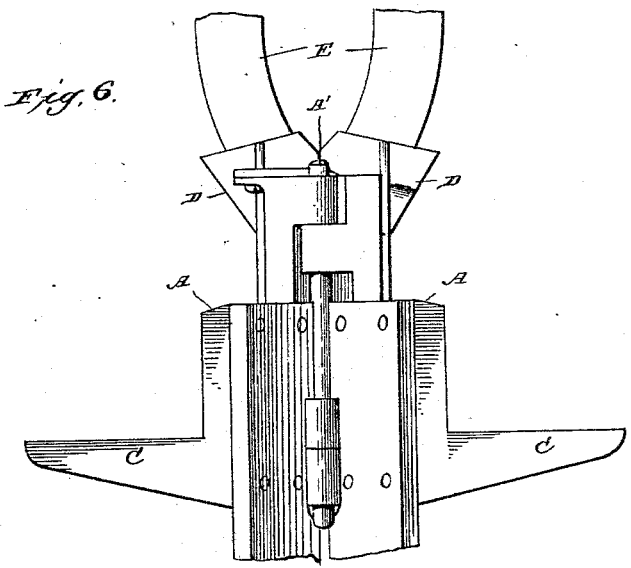
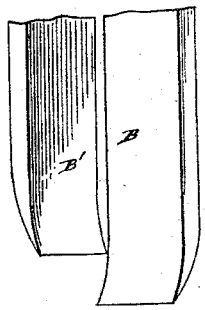
Witnesses
E. L. Smith
Thomas Durant
Inventor
Wesley Young
By his Attorneys
Clunch & Clunch

UNITED STATES PATENT OFFICE.

WESLEY YOUNG, OF DAYTON, OHIO.

IMPLEMENT FOR PLANTING HEDGES.

SPECIFICATION forming part of Letters Patent No. 425,531, dated April 15, 1890.

Application filed January 6, 1890. Serial No. 336,031. (No model.)

*To all whom it may concern:*

Be it known that I, WESLEY YOUNG, of Dayton, in the county of Montgomery and State of Ohio, have invented a certain new and useful Improved Implement for Planting Hedges; and I do hereby declare the following to be a full, clear, and exact description of the same, reference being had to the accompanying drawings, forming a part of this specification, and to the letters of reference marked thereon.

My invention has for its object to provide an implement for use in planting hedge-plants, whereby the planting operation is greatly facilitated and much labor saved.

I will first describe my invention, and then point out its particular features of novelty in the clauses of claim at the end of this specification.

Figure 1:
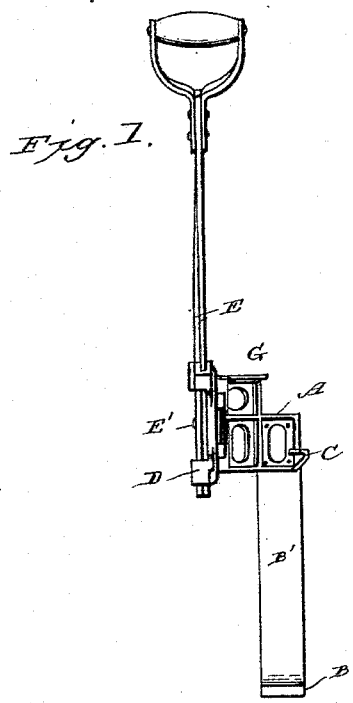
Figure 2:
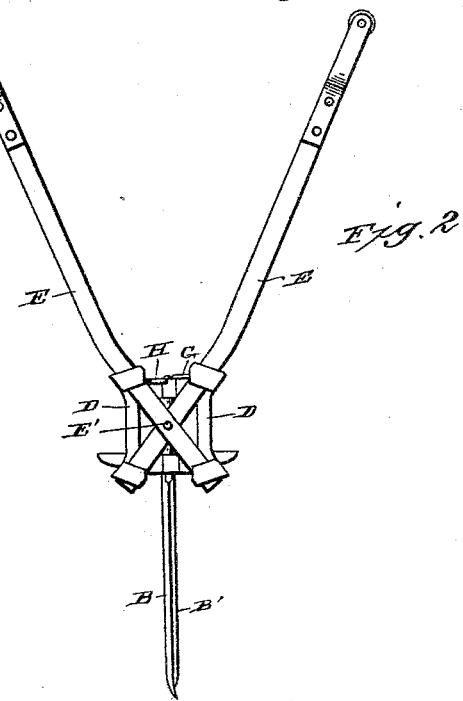
Figure 3:
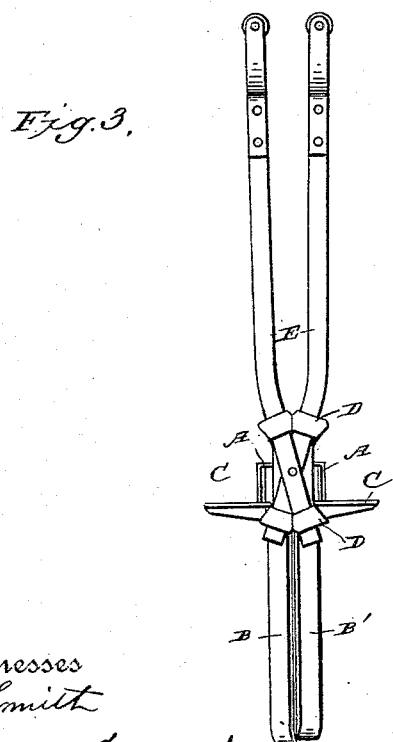
Figure 4:
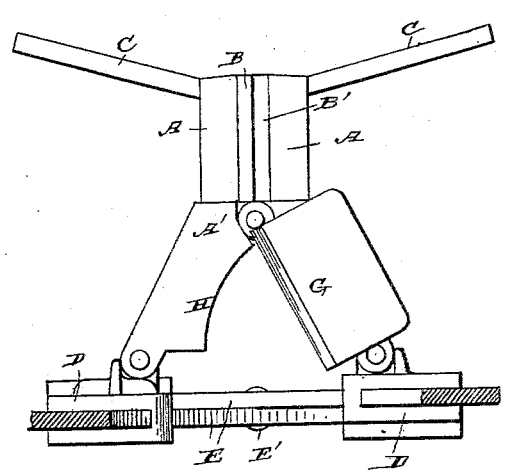

In the accompanying drawings, Figure 1 represents a side elevation of my improved implement; Fig. 2, a front elevation of the same, showing the parts in the position which they occupy when the blades are forced into the ground; Fig. 3, a similar view showing the position of the parts when the handles have been brought together and the blades opened to enlarge the opening in the ground for the reception of the plant. Fig. 4 is a top plan view of the implement when in the position shown in Fig. 2; Fig. 5, a similar view of the implement when in the position shown in Fig. 3. Fig. 6 is a rear view of the implement when in the position shown in Fig. 3.

Referring to the drawings, A A are what may be termed "hinged heads," each consisting, preferably, of a stout angular metal casting and hinged together on vertical centers at or near their middles, as shown at A' in Figs. 4, 5, and 6, so as to open and shut horizontally. To the rear inner faces of these heads A are secured metal blades B B', the former of which is slightly longer than the latter and is curved inward slightly, so as to lightly overlap the lower edge or point thereof and prevent the ingress of earth, &c., when the closed blades are driven down into the ground. The rear portions of the said head A A are further provided with stout outwardly-projecting prongs C C, which serve as foot-rests for driving the blades deeply into the ground by the pressure of the operator's foot. To the forward portions of the heads A A are hinged handle-sockets D D, and in these handle-sockets are arranged a pair of crossed handles E E, said handles being pivoted together at E' and each of them arranged to operate within an upper socket on one of the heads and a lower socket on the opposite head, as shown, the result of this construction and arrangement being to cause the blades B B to be closed when the handles are spread apart, as shown in Figs. 2 and 4, and to cause said blades to be separated, so as to leave a V-shaped channel between them from top to bottom when said handles are brought together, as shown in Figs. 3, 5, and 6.

My improved implement is used in the following manner: When the plants for the proposed hedge fence are ready to be set, the operator, after separating the handles so as to bring together the blades, drives the blades by the pressure of his foot on one of the prongs C as deeply into the ground as it is desired to embed the plant, which done, he then brings the handles together so as to open out or separate the blades, as shown in Figs. 5 and 6. The opening of the blades causes the earth to be forced aside and leaves a V-shaped space between the blades, into which the plant may be thrust before the implement is withdrawn from the ground.

For the purpose of cutting off previous to planting the roots of the plants when they are too long to go a sufficient depth in the ground I provide the forward upper portions of the heads A A with co-operating cutting-blades G H, as shown in Figs. 4 and 5.

In planting hedge fences in the ordinary way the operator first inserts a spade in the ground at an angle, then raises up the handle and inserts the plant in the opening under the spade; but inasmuch as dirt falls into the opening at the sides the plants become doubled up and cannot be inserted straight, as a result of which a large percentage of them die. By the use of my improved implement a clear opening is made each time, the plants are not doubled up in being inserted, and by being planted at a sufficient and uniform depth they not only live and thrive, but can be better and easier wired down or plashed when time for that operation arrives.

Having thus described my invention, what I claim as new is—

1. In an implement such as described, the combination, with the two blades hinged together on vertical centers so as to swing horizontally, of the handles for opening and closing said blades, substantially as described.

2. The combination, with the heads hinged on vertical centers, of the vertical blades secured thereto and means for opening and closing the heads, substantially as described.

3. The vertical blades formed of unequal lengths and the point of one of them curved to lap the point of the other, in combination with the hinged heads to which said blades are connected, substantially as described.

4. The combination, with the heads hinged on vertical centers and the vertical blades connected thereto, of handles for opening and closing said heads, substantially as described.

5. The combination, with the hinged heads and the vertical blades connected thereto, of the hinged handle sockets and handles co-operating with said sockets, substantially as described.

6. The combination, with the hinged head and vertical blades connected thereto, of the hinged handle-sockets and the crossed handles pivoted together, substantially as described.

7. The combination, with the hinged heads provided with the horizontal cutting-blades, of the handle-sockets hinged to said heads and the handles co-operating with said sockets, substantially as described.

8. The combination, with the hinged heads and the vertical blades connected thereto on one side of the hinge, of the co-operating cutting-blades mounted on said heads on the other side of the hinge and means for opening and closing the heads, substantially as described.

9. The combination, with the hinged heads carrying the vertical blades and the cutting-blades, of the hinged handle-sockets and the handles co-operating therewith, substantially in the manner and for the purpose specified.

WESLEY YOUNG.

Witnesses:
H. H. PRUGH,
WM. S. BROWE.